United States Patent [19]

Leonard et al.

[11] Patent Number: 4,752,676
[45] Date of Patent: Jun. 21, 1988

[54] RELIABLE SECURE, UPDATABLE "CASH" CARD SYSTEM

[75] Inventors: Eugene Leonard, Sands Point; Bill Perlman, New York, both of N.Y.

[73] Assignee: Common Bond Associates, St. Louis, Mo.

[21] Appl. No.: 808,275

[22] Filed: Dec. 12, 1985

[51] Int. Cl.$^4$ .............................................. G06F 15/30
[52] U.S. Cl. .................................. 235/379; 235/449; 235/493; 380/24
[58] Field of Search ............... 235/379, 380, 382, 449, 235/493; 380/25, 24, 46

[56] References Cited

U.S. PATENT DOCUMENTS

| | | | |
|---|---|---|---|
| 3,896,266 | 7/1975 | Waterbury | 235/380 |
| 4,123,747 | 10/1978 | Lancto et al. | 380/25 |
| 4,140,272 | 2/1979 | Atalla | 235/380 |
| 4,186,871 | 2/1980 | Anderson et al. | 235/380 |
| 4,304,990 | 12/1981 | Atalla | 380/24 X |
| 4,423,287 | 12/1983 | Zeidler | 235/382 X |
| 4,645,916 | 2/1987 | Raisleger | 235/449 |

Primary Examiner—David L. Trafton
Attorney, Agent, or Firm—Roberts, Spiecens & Cohen

[57] ABSTRACT

A method of using a card which has a substrate with at least one magnetic track thereon, the method involving dividing the track into a plurality of spaced blocks with a start sentinel being magnetically recorded at the start of each block. A user's critical data is recorded in at least some of the blocks, this critical data including a portion of the user's personal identification number. The method further includes enhancing the security of a cash card by recording in variable locations on the cash card the last date when the user has had a transaction with a terminal, recording in scrambled locations on the card balance information plus security information and storing in a terminal a set of descrambling tables. The user introduces the card into the terminal and enters the user's personal identification number associated with the card. The terminal reads and stores the information recorded on the card and performs a calculation utilizing the personal identification number to locate in the stored information the aforementioned last date. If the last date is earlier than a predetermined date, the central office is accessed for data to be used in continuing the transaction. If the last date is more recent, a calculation is performed using the last date and personal identification number to select one of the descrambling tables, which is then used to locate particular portions of the stored information.

11 Claims, 2 Drawing Sheets

RELIABLE SECURE, UPDATABLE "CASH" CARD SYSTEM

FIELD OF THE INVENTION

Secure cash card system.

BACKGROUND OF THE INVENTION

This invention relates to electronic funds handling systems and more particularly to systems of this type which use cash cards.

There are at present two techniques available for electronic fund handling at the consumer level. The first of these is the conventional credit card. This technique uses the card primarily for identification. Therefore, the reliability requirements with respect to damage or accidental erasure are relatively modest. The security offered by the card in terms of loss, being stolen or counterfeiting is marginal since the security mechanisms include reference to a printed negative file or money limits requiring a telephone communication to authorize the transaction. Further communication is required on a nightly basis to a clearing house so that the eventual monthly paper statement can be prepared for the consumer who then responds by paying in one form or another. The security at the point of transaction consists primarily of a comparison of the signature on the reverse side of the card with the signature on the appropriate sales slip at the time of the transaction.

The second type of card is a debit card sometimes called an ATM card. This card is essentially an identification card so that the requirements in terms of reliability are reasonably modest. Destruction, erasure or loss may be handled by system protocol. The card is used in an on-line fashion and the identification of the person is accomplished by means of a PIN (personal identification number) associated with the person and/or the card. With such a card, unattended operation is possible by means of presently available "automatic teller machines". Transaction reporting is accomplished by means of a receipt at the time of the transaction and a monthly statement.

The use of stolen cards or the creation of counterfeit cards by technically-skilled people is relatively easy for the two above types of cards. The credit card system is easily invaded since reporting of anomalous activity involving a card may entail a significant period of time before the card's use can be stopped. For the debit card, loss can continue until preset activity or money limits are reached or until the account is depleted. Because the information contained in the magnetic stripes of the card can be extracted by technically-skilled individuals, the PIN (personal identification number) scheme of identification can be easily subverted since most standards include the PIN code scrambled in a well-known algorithm.

The further problem that exists with card systems is the cost of operation imposed by on-line communication with a central station. This cost is very significant.

These considerations have led to the concept of an updatable card in which variable information, including various cash and interest, discount and savings balances can be maintained on the card. Furthermore, variable security information may also be maintained on the card leading to the potential for both attended and unattended off-line operations. The presence of balances such as cash on the card has led to the "cash card" terminology. However, the card now becomes virtually the equivalent of money. Thus, the presence of such balances requires a much higher level of not only reliability, but also security in the card system.

BRIEF SUMMARY OF THE INVENTION

It is, accordingly, a general object of the invention to provide an improved secure cash card system.

It is another object of the invention to provide an improved cash card which minimizes the loss or destruction of information magnetically recorded on the card.

Briefly, according to this aspect of the invention, there is contemplated a cash card having a card-like substrate with at least two magnetic stripes. One stripe using conventional standard coercivity magnetic material carries the three standard (ISO 3554) data tracks. The other stripe carries two tracks, the first of which is divided into a plurality of blocks with a start sentinel magnetically recorded at the start of each block. Recorded in at least two of the blocks is the user's available balance and recorded in at least two of the blocks there is also recorded at least a portion but preferably not all of the user's PIN. In general, there are more than two blocks and preferably up to five. Thus, the PIN and the balance information need not be recorded in the two same blocks. The second track carries biometric data (i.e. voice print data). This second stripe uses very high coercivity magnetic material in order to enhance security. It should be noted that the blocks will also contain further information as will become apparent hereinbelow.

It is another object of the invention to provide a secure method of utilizing cash cards.

According to this object of the invention, there is contemplated a cash card system having a central office connected via a communications link to a terminal. Security is enhanced by recording in fixed location on a cash card the account number of the user and recording in another fixed location the last date when the user had a transaction with the central office. There is additionally recorded in scrambled locations on the cash card, cash balance information. There is also stored in the terminal a set of descrambling tables. In a preferred embodiment at the time of use when the user introduces the cash card into the terminal and enters the entire PIN associated with the cash card the terminal performs a calculation utilizing that portion of the entered PIN which is not stored on the card to locate, in the stored information, such last date. A further calculation is then performed utilizing the user's account number and the located last date to select one of the descrambling tables. This selected table is then used to locate other stored information such as balances. An alternative embodiment may require only the truncated PIN and the date to select the descrambling table.

It is a further object of the invention to enhance the security of a card having unique information for utilization at an unattended station.

This aspect of the invention contemplates recording on the card unique information about a user as well as recording on the card voice print information of a password previously spoken by the user. At the time of use, when the user introduces the card into the terminal and enters the unique information associated with the card, the terminal reads and stores such recorded information. There is then a comparison of the entered unique information with the previously recorded unique information, and, if an inequality is found, the user is instructed with respect to further procedures. The terminal may have required at an earlier point that the user speak into the terminal a private password. The terminal generates voice print information from the spoken word and compares this generated voice print information with the stored biometric voice print information on the second stripe. The result of this comparison is then utilized to determine further processing.

BRIEF DESCRIPTION OF THE DRAWING

Other objects, features and advantages of the invention will be apparent from the following detailed description when read in accompaniment with the drawing wherein.

DETAILED DESCRIPTION OF THE INVENTION

Figure 1:
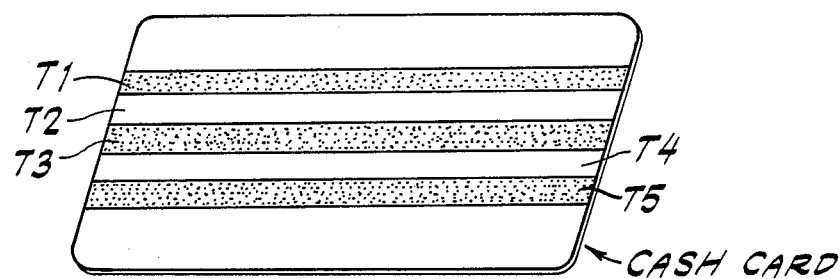
FIG. 1 is a view of a cash card utilized by the invention.
Figure 2:
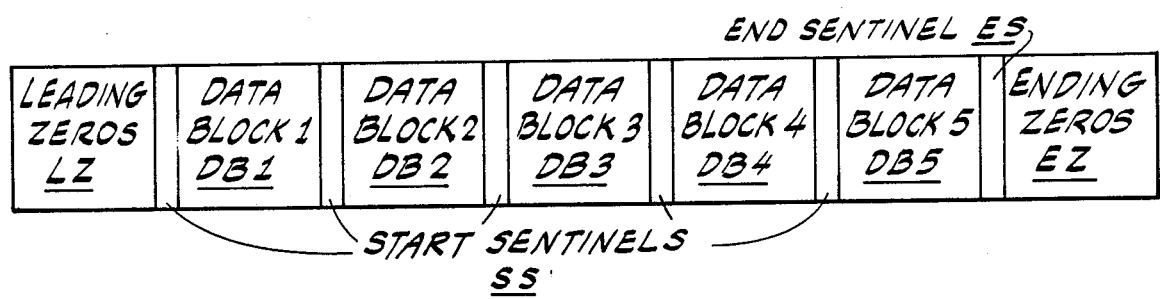
FIG. 2 is the topological representation of the recording on one of the tracks of the cash card of FIG. 1 in accordance with the invention.

In FIG. 1 there is shown a cash card in the form of a plastic substrate upon which there are recorded a plurality of (preferably five) tracks T-1 to T-5. The dimensions of the card and the topography follow the specifications promulgated by the International Standards Organization for credit cards. The first three tracks T-1, T-2 and T-3 also follow the specification for a three-track magnetic stripes that has been industry promulgated. For the present invention, there is needed only the second stripe. However, for universality of the invention, it is preferable to utilize three tracks since each track is associated with a different industry. For example, track T1 is usually used by the airlines, track T2 by the banking association and track T3 is utilized for automatic teller machine operations. Common to each of these tracks is a user's account number. For the sake of universality, the card is shown provided with all three tracks. In addition, thereto, in accordance with the invention, there is provided a track T4 whose format is shown in FIG. 2. In addition thereto, in accordance with a further feature of the invention, there is provided a track T5 upon which is recorded the digital voice print of a password previously generated by the user at the time of issuance of the cash card by the banking source. (The voice print can be generated by a VADAS manufactured by Voice Control Ltd., 7 The Quay, St. Ives, Cambridge, England, or by similar devices manufactured by Interstate Electronics Corporation 1001 E. Ball Road, P.O. Box 3117, Anaheim, Calif.).

Track T4 contains the variable information which must be maintained secure. The track starts with a set of leading zeros LZ which is used to synchronize a card reader. Following these zeros are five data blocks DB1–DB5. At the start of each data block is a start sentinel SS to indicate the start of the block. At the end of the fifth block DB5, there is the end sentinel ES followed by a set of ending zeros EZ. Thus, during a reading operation, the leading zeros LZ bring the card reader into synchronization and the start sentinels SS indicate the block demarcations in a conventional manner. Typical data that is stored can include balances, savings, the PIN, etc. In addition thereto, in accordance with the invention, there is also stored a last load date. This date is the date indicating the last time the card balance was reduced or replenished. During a typical transaction, balances and appropriate security data are updated and all the information is re-recorded followed by a "read-after-write" operation to assure correct recording. (The replenishment updating and re-recording form no part of the present inventions; therefor these operations will not be described in detail.) It will be assumed for the present invention that the user has a completely updated card. In order to increase the reliability of the card, the invention contemplates recording the balance in at least two different blocks. Preferably, sensitive information such as balances and PINS are recorded in random positions in the five blocks. During the updating and re-recording, the information such as balances and PINS, is recorded in a scrambled manner among the five blocks. The data scrambling is in accordance with one of a set of five different scrambling tables. The scrambling tables are generated in the central office and are changed, say, the first of every month. Thus, whenever the central office replenishes or updates a cash card via a terminal, it will scramble the data in accordance with one of the five tables then in use. The particular table it will use will be a function of the user's account number which has been recorded on one of the first three tracks, T1 to T3. In addition, during the replenishing the central office will record in a fixed (unscrambled) position of three of the five blocks, the date of the replenishment. The selection of the blocks will be a function of a portion of the user's PIN. By way of example, it will be assumed that it is the two least significant digits of a six-digit PIN. Finally, monthly, or more frequently if desirable, when the tables are changed, the central will transmit to each terminal the new set of tables for the coming month.

Figure 3:
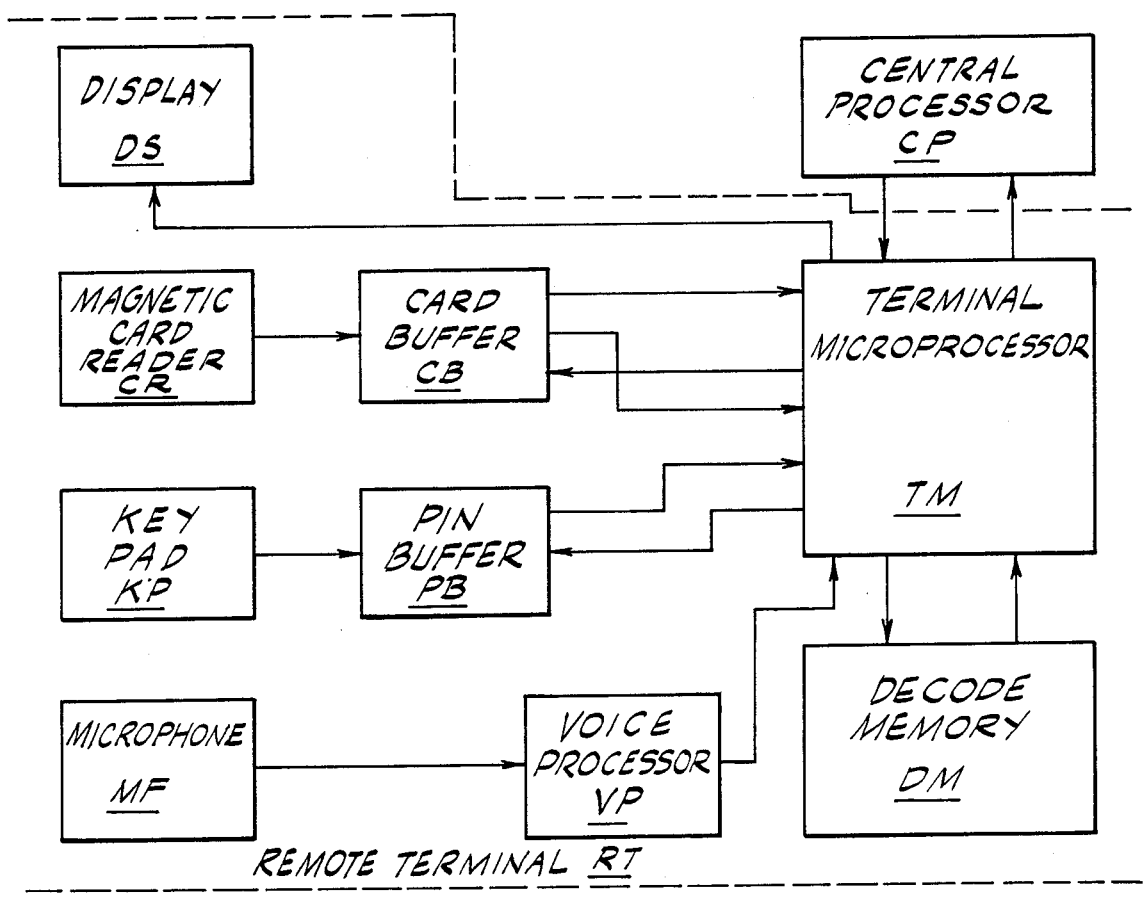
FIG. 3 is a block diagram of a cash card system.

The cash card just described is used in the cash card system CSS as shown in FIG. 3. This system includes a central processor CP and a plurality of remote terminals. Only one of such remote terminals RT is shown in the system.

The central processor CP can typically be the main office of a bank connected via a telephone link to the remote terminal RT. Within the central processor is kept data with respect to each of the users and particularly their balances, PIN numbers, activity and the like. Most transactions do not require access to the central processor. The central processor CP via the phone cables to the terminal is called upon by the terminal only when certain transactions or a suspect transaction is attempted. The remote terminal RT centers around the terminal microprocessor TM which can typically be a Motorola 6809 microprocessor. The microprocessor TM communicates only if necessary with the central processor CP and the display DS which is typically a conventional cathode-ray tube display found in presently available automatic teller machines. In addition, the microprocessor TM communicates a decode memory DM which can be of the type 64K DRAM (for example, a Texas Instrument 4164). The decode memory stores the descrambling tables. A magnetic card reader CR can be similar to a magnetic stripe reader manufactured by Vertex Industries, Inc. of 23 Carol Street, Clifton, N.J. 07014-1123 but with special high energy heads. The card reader is connected via a card buffer CB to the terminal microprocessor TM. Thus, as the card is read, the data is stored in the buffer CB. A key pad KO of conventional design is used for the entry of the PIN. The generated PIN is loaded into a PIN buffer PB for use in calculations of the microprocessor TM. Finally, a microphone MF is available to the user for generating passwords. The output of the microphone MF is fed to a voice processor VP which also receives the digital voice print on track T5 from the card buffer CB. The voice processor VP can be a modified VADAS as mentioned above.

Before describing the operation of the system, there will be discussed the overall concept of the security scheme. The security scheme is based on a PIN check approach and data being scrambled on track T4. The data scrambled on track T4 will be in two levels. The first level concerns the date of last load. This date determines which scrambling scheme and descrambling table is to be used. Terminals will be updated with a new set of descrambling tables for example every thirty days. Each table points to the location of data on track T4. The terminal holds three sets of these tables covering ninety days of scrambled information. If the cash card has not been updated in that time, the terminal will go on line to obtain the information. The two least significant digits of the PIN entered by the user are used to locate the data of the last load in track T4. These PIN digits are not stored on the card. However, the remaining PIN digits are part of track T4 data and are used to verify the validity of the entered PIN once the data has been decoded. Track T4 data contains two copies of the more significant portion of the PIN and two copies of the date of last use. One copy of the date was obtained as above while the second copy is left in the scrambled data. Once the date has been decoded based on the input PIN, the decoding will be verified by comparing the input PIN with both copies of the PIN on the card and comparing the two copies of the date. The chance of an error that all three data fields will match given a wrong PIN, is extremely small.

Figure 4:
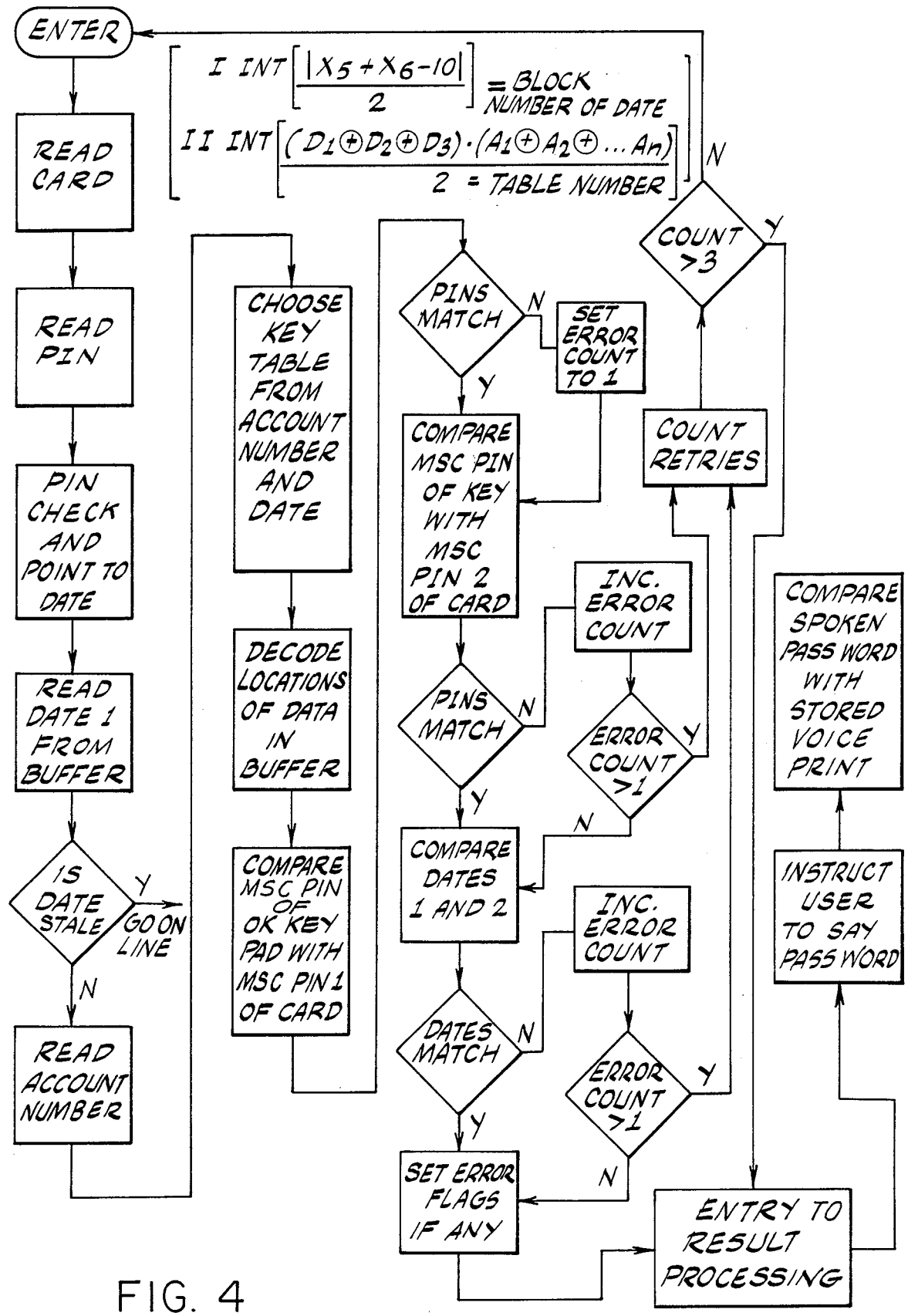
FIG. 4 is a flow chart of the operation of the system shown in FIG. 3.

A typical operation of the system will now be described by the flow chart of FIG. 4. A user inserts his card into magnetic card reader CR (FIG. 3) and the contents of the tracks of the card are loaded into card buffer CB. The user then inserts his PIN via key pad KP. The PIN is loaded in PIN buffer PB. The terminal microprocessor TM performs the calculation I (see FIG. 4) by extracting the two least significant digits X5 and X6 of the entered PIN from the buffer PB. This calculation results in an integer having a value from 1 to 5. This integer indicates which block of data holds, for example, the most significant byte of the data of last use. The date can be a 3 digit number between the values of 011 and 366. For example, the date can be stored in the first character positions of the indicated block and the following two blocks. The date is read from the card buffer CB and compared in the microprocessor TM with the oldest permissible date. If the date of the last transaction is later than this oldest permissible date, the terminal signals the central processor of such fact so that it can deliver to the terminal the tables associated with the stale date. Alternately, the central can receive the PIN and the date returning appropriate instructions to the terminal. The microprocessor TM then reads the account number from, say, track T2 now stored in the card buffer CB. The microprocessor TM now performs the calculation II shown in FIG. 4. This calculation includes the three digits of the date and the digits of the account number. In this way, the appropriate descrambling table is located. The tables are stored in decode memory DM. Using the selected descrambling table, the microprocessor TM now locates the first more significant portion of the PIN and compares it with the more significant portion of the PIN stored in the PIN buffer PB. If the PINS do not agree, the microprocessor TM stores an error count of 1. In any event, after the PIN comparison test, the microprocessor locates the second more significant portion of the PIN stored in the other scrambled location and a second PIN comparison is performed. If there is a mismatch, the error count is incremented. If now the error count is greater than 1 implying that there have been mismatches for both PINS, a retry routine is initiated. That is, the program is cleared and the user is instructed to reinsert his card and re-enter his PIN. However, if the PINS did match or there are less than two errors, then the routine continues by comparing the stored dates. If the dates do not match, the error count is again incremented and there is a test to see whether there has been more than one error. If so, the retry routine is initiated. If the dates do match, or there are less than two errors, then it is assumed that the entry is valid. This validity will start the next step of the data entry result processing routine to permit the debiting of balances on the card. If, on the other hand, there have been more than three retries, the data entry result processing routine would effectively disallow the entry and indicate such fact to the user by means of display DS and also send an indication to the central processor CP.

If there had been a valid data entry then before signalling the central processor CP the user is instructed via display DS to speak the password into microphone MF while the voice print stored in the card is the card buffer holding the track T5 of data read from the biometric track into voice processor VP. Processor VP then generates a voice print of the spoken password and compares such generated voice print with the stored print. Match can permit further processing as above while mismatch can, for example, be sent to the central processor CP as above.

What is claimed is:

1. A method of using a card comprising a cardlike substrate having at least one magnetic track on said substrate, said method comprising dividing said track into a plurality of sequential blocks with a start sentinel being magnetically recorded at the start of each block, and recording in at least two of said blocks a user's critical data.

2. The method of claim 1 wherein is recorded in at least two of said blocks at least a portion of the user's personal identification number.

3. The method of claim 1 further comprising providing a second magnetic track on said card and magnetically recording on said second track a digital voice print of a password previously spoken by the user.

4. In a cash card system having a terminal with the ability to access a central office via a communication link, the method of enhancing the security of a cash card comprising the steps of recording in a variable location on a cash card the last date when the user had a transaction with a terminal, recording in scrambled locations on the cash card cash balance information plus security information, storing in the terminal a set of descrambling tables, the user introducing the cash card into the terminal and entering the PIN associated with the cash card, the terminal reading and storing the information recorded on the cash card, the terminal performing a calculation utilizing the entered PIN to locate in the stored information said last date, if said last date is earlier than a predetermined date access the central office for the data to be used in continuing the transaction, if said last date is more recent performing a calculation utilizing said last date and PIN to select one of the descrambling tables, and utilizing the selected descrambling table to locate particular portions of the stored information.

5. The system of claim 4 in which a user account number is contained in an available unscrambled track, at least parts of said account number being used in the descrambling process.

6. The method of claim 4 wherein in one of the scrambled locations there is stored only a portion of the PIN associated with the card, the selected descrambling table is utilized to locate said portion of the PIN, and further comprising said terminal comparing said located portion of the PIN with the corresponding portion of the user entered PIN, if equality does not exist recording said fact.

7. The method of claim 4 wherein in two different scrambled locations there is stored the same portion of the PIN associated with the card, and further comprising utilizing the selected descrambling table to sequentially locate said portions, comparing each located portion of the PIN with the corresponding portion of the user entered PIN and recording any inequalities.

8. The method of claim 7 further comprising giving an indication wherever the number of inequalities exceeds a given number.

9. The method of claim 7 wherein there is recorded on the cash card a digital voice print of a particular word previously spoken by the user and further comprising reading and storing said digital voice print in the terminal, and as a result of said comparing step, said user speaking said word, generating a digital voice print of said spoken word and comparing the generated digital voice print with the stored digital voice print.

10. A method as claimed in claim 2 comprising recording in said two blocks less than all of the user's personal identification number.

11. A method as claimed in claim 1 comprising varying placement of the critical data in the respective blocks.

* * * * *